United States Patent
Ng et al.

(10) Patent No.: US 9,740,131 B2
(45) Date of Patent: Aug. 22, 2017

(54) LIQUID ELECTROPHOTOGRAPHIC INKS

(71) Applicant: Hewlett-Packard Development Company, L.P., Houston, TX (US)

(72) Inventors: Hou T. Ng, Campbell, CA (US); Howard S. Tom, San Jose, CA (US); Albert Teishev, Rishon le-zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/107,912

(22) PCT Filed: Feb. 20, 2014

(86) PCT No.: PCT/US2014/017296
§ 371 (c)(1),
(2) Date: Jun. 23, 2016

(87) PCT Pub. No.: WO2015/126394
PCT Pub. Date: Aug. 27, 2015

(65) Prior Publication Data
US 2016/0320718 A1    Nov. 3, 2016

(51) Int. Cl.
*G03G 9/08* (2006.01)
*G03G 9/12* (2006.01)
*C09D 11/037* (2014.01)
*G03G 9/125* (2006.01)
*G03G 9/135* (2006.01)
*G03G 9/13* (2006.01)

(52) U.S. Cl.
CPC .......... *G03G 9/122* (2013.01); *C09D 11/037* (2013.01); *G03G 9/0804* (2013.01); *G03G 9/125* (2013.01); *G03G 9/132* (2013.01); *G03G 9/135* (2013.01)

(58) Field of Classification Search
CPC .................................... G03G 9/0804
See application file for complete search history.

(56) References Cited

U.S. PATENT DOCUMENTS

| | | |
|---|---|---|
| 5,927,621 A | 7/1999 | Ziolo et al. |
| 6,166,105 A | 12/2000 | Santilli et al. |
| 7,727,325 B2 | 6/2010 | Hino et al. |
| 7,985,796 B2 | 7/2011 | Shimanaka et al. |
| 8,319,916 B2 | 11/2012 | Matsumoto et al. |
| 2011/0104441 A1 | 5/2011 | Bhattacharyya |

(Continued)

FOREIGN PATENT DOCUMENTS

| | | |
|---|---|---|
| EP | 2689937 | 1/2014 |
| WO | WO 2013103346 | 7/2013 |

OTHER PUBLICATIONS

International Search Report and Written Opinion for International Application No. PCT/US2014/017296 dated Nov. 19, 2014, 9 pages.

*Primary Examiner* — Hoa V Le
(74) *Attorney, Agent, or Firm* — HP Inc. Patent Department (57) ABSTRACT

A method of manufacturing a liquid electrophotographic ink concentrate includes: milling a mixture comprising ink pigments and polyamine-based dispersants in the presence of milling media to produce nano-scale ink pigments having an average particle size of less than 100 nanometers; and attaching at least one nano-scale ink pigment near surfaces of a base resin particle to form a pigment-resin composition.

20 Claims, 5 Drawing Sheets

(56) References Cited

U.S. PATENT DOCUMENTS

| | | |
|---|---|---|
| 2011/0124768 A1* | 5/2011 | Claes ................... C09D 11/101 |
| | | 522/182 |
| 2011/0200927 A1 | 8/2011 | Jung et al. |
| 2012/0004345 A1 | 1/2012 | Chun et al. |
| 2012/0009516 A1 | 1/2012 | Ganapathiappan et al. |
| 2012/0196222 A1* | 8/2012 | Chun ....................... G03G 9/00 |
| | | 430/112 |
| 2013/0288176 A1 | 10/2013 | Ganapathiappan et al. |
| 2013/0302733 A1 | 11/2013 | Chun et al. |
| 2013/0323636 A1 | 12/2013 | Bar-Haim et al. |

* cited by examiner

LIQUID ELECTROPHOTOGRAPHIC INKS

BACKGROUND

Electrophotographic (EP) printing involves the formation of a latent image on a photoconductor surface mounted on an imaging plate or other surface. In some instances, the photoconductor surface is first charged and then exposed to light projected through a positive film of the document to be reproduced, resulting in discharge in the areas exposed to the light. The latent image is subsequently developed into an image by the attraction of oppositely charged toner particles to the charge remaining on the surface. For liquid electrophotographic (LEP) inks, the developed image is electrostatically transferred from the photoconductor surface to a blanket, from which it is transferred to a printing substrate by heat, pressure, or a combination of both to form the printed final image.

BRIEF DESCRIPTION OF THE DRAWINGS

The following detailed description references the drawings, wherein.

DETAILED DESCRIPTION

The global print market is in the process of transforming from analog printing to digital printing. Digital printing involves technologies in which a printed image is created directly from digital data, for example using electronic layout and/or publishing programs. As described above, electrophotographic printing is a technique of digital printing that sometimes utilizes liquid-based inks.

Liquid electrophotographic (LEP) inks currently used in digital printing presses typically employ an ink pigment in a carrier. The LEP inks may often include a resin, as well as other ink components for altering various properties. The resin holds the ink pigments on the print substrate. Typically, the LEP inks are first manufactured as concentrated pastes by a multi-step process. The inks may be formed for printing by adding a sufficient quantity of a carrier liquid and other additives. Due to the cost of LEP inks, effort has been spent into developing methods of ink production that lower cost per page without decreasing image quality. One factor for an image's quality is its optical density. A high optical density is typically desired for an image.

Examples disclosed herein provide for methods of manufacturing liquid electrophotographic ink concentrates where nano-scale ink pigments are attached near surfaces of resin particles. Examples disclosed herein also provide for LEP inks formed from such ink concentrates. These liquid electrophotographic inks may form a final ink layer where the nano-scale ink pigments are concentrated near surfaces of the final ink layer.

In this manner, the example final ink layers of the LEP inks disclosed herein exhibit improved optical density. Correspondingly, similar optical densities are obtainable with lower pigment concentrations. The nano-scale sizes of the ink pigments in combination with a physical placement closer to the surfaces of resin particles may enhance the optical absorption efficiency of the LEP ink, and therefore achieve a desired improvement in optical density of the final ink layer printed on a substrate.

Figure 1:
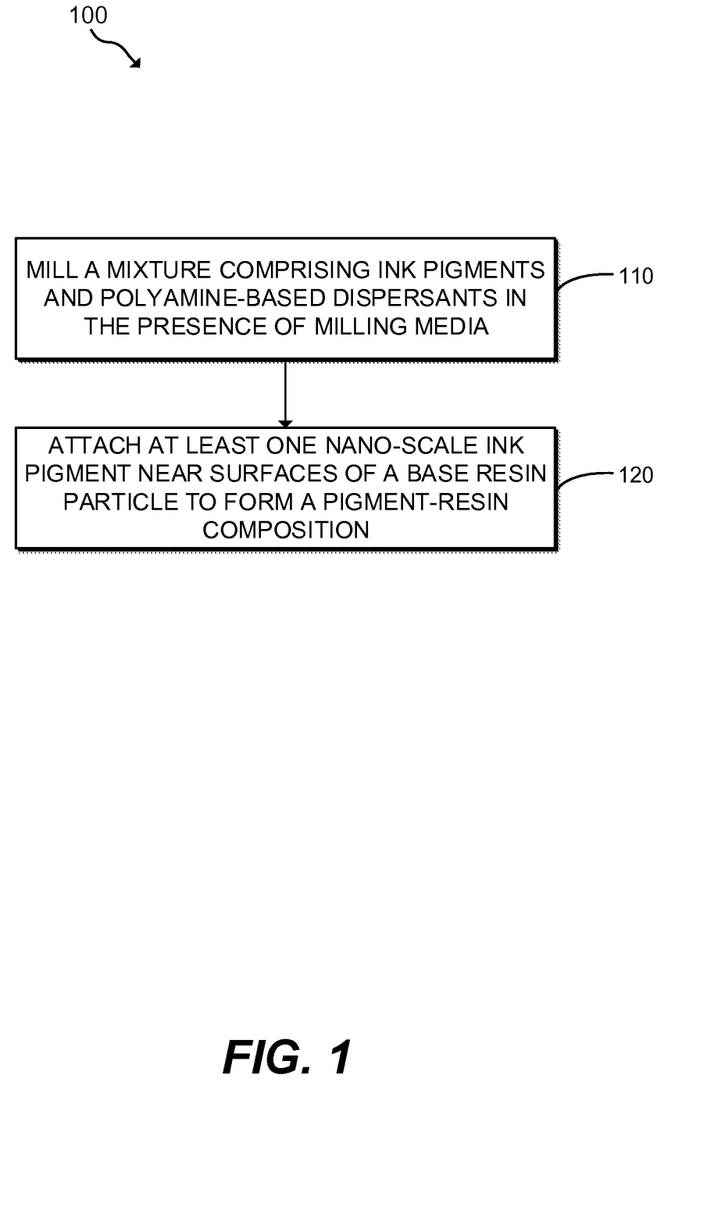
FIG. 1 is a flowchart of an example method for manufacturing a liquid electrophotographic ink concentrate.

Referring now to the drawings, FIG. 1 depicts a flowchart of an example method 100 for manufacturing an LEP ink concentrate, which may include step 110 for milling a mixture comprising ink pigments and polyamine-based dispersants in the presence of milling media to produce nano-scale ink pigments having an average particle size of less than 100 nanometers and step 120 for attaching at least one nano-scale ink pigment near surfaces of a base resin particle to form a pigment-resin composition. An LEP ink concentrate may be a mixture that may be diluted or otherwise modified to form an LEP ink that is ready for printing. An LEP ink concentrate may include a mixture of ink pigments, resin, and carrier liquid.

In step 110 for milling a mixture comprising ink pigments and a polyamine-based dispersant in the presence of milling media, average particle size may be refer to the mean of the diameters of the ink pigments. Although the ink pigments can be of any color, in some examples, yellow ink pigments are used to produce nano-scale yellow pigments. Non-limiting examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 155, C.I. Pigment Yellow 167, C.I. Pigment Yellow 172, C.I. Pigment Yellow 180. In some examples, a mixture of pigments may be employed, such as Pigment Yellow 154 and Pigment Yellow 74 or any other combinations.

In other examples, magenta nano-scale ink pigments are produced from magenta ink pigments. Non-limiting examples of suitable magenta or red pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I.

Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, or C.I. Pigment Violet 50. In some examples, a mixture of pigments may be employed.

Similarly to the various ink pigments, a number of polyamine-based dispersants may be used in step 110. Polyamine-based dispersants may be a polyamine-containing liquid chemical that behaves similar to a lubricant by promoting the separation of ink pigments during milling, thereby aiding the uniform milling of each individual pigment. Non-limiting examples of polyamine-based dispersants are commercially available from Lubrizol Corporation (e.g., the Solsperse® Hyperdispersants series, such as Solsperse® 8000, Solsperse® 11000, Solsperse® 13300, and Solsperse® 19000).

The mixture resulting from step 110 may include polyamine-based dispersants in amounts ranging from about 20% to about 75% with respect to pigment concentration. Until a threshold amount, the average particle size of the produced nano-scale ink pigments generally decreases with increasing dispersant amount. In one example, yellow nano-scale ink pigments with an average particle size of about 95 nanometers may be produced by milling a mixture of yellow ink pigments and about 20% polyamine-based dispersants with respect to the amount of the ink pigments. In another example, magenta nano-scale ink pigments with an average particle size of about 75 nanometers may be produced by milling a mixture of magenta ink pigments and about 75% polyamine-based dispersants.

In some implementations of step 110, the mixture is milled using high shear with an attritor in the presence of milling media. For example, the mixture may be milled using a Union Process® wet grinding attritor at a milling temperature of about 25° C. In some examples, the milling media includes a ceramic grinding media having an average size of about 0.05 millimeters (mm). A non-limiting example of a ceramic grinding includes 3M™ Micro Milling Media ZGC-50.

In addition to high shear milling, the mixture may sometimes undergo a number of other processes to assist in mixing. For example, the mixture may be ultrasonically mixed prior to the introduction of milling media. In some implementations, the mixture may also include an amount of a carrier liquid, which may lower the viscosity of the mixture and promote the milling process. The carrier liquid may include an isoparaffinic hydrocarbon such as the commercially available Isopar™ isoparaffinic fluids from ExxonMobil (e.g., Isopar™ L series).

Step 120 for attaching the nano-scale ink pigments near surfaces of a base resin particle to form a pigment-resin composition may include dispersing the nano-scale ink pigments produced in step 110 in a carrier liquid; mixing a resin paste with the nano-scale ink pigments dispersed in the carrier liquid to form a mixture; and mixing the mixture in a mill in the presence of milling media. Attaching may mean a nano-scale ink pigment is fully encapsulated by a resin particle. Attaching may also mean a nano-scale ink pigment is affixed to the surface of a resin particle, with or without penetration of the nano-scale ink pigment into the resin particle. In some examples, such as liquid electrophotographic ink concentrate 300 illustrated in FIG. 3, a number of nano-scale ink pigments may be attached to a resin particle with varying depths of penetration. Some ink pigments may be fully enclosed by the resin, some may be partially encapsulated, and some may only be attached to the surface of the resin particle.

A carrier liquid, such as an isoparaffinic hydrocarbon like Isopar® L, may be mixed with the nano-scale ink pigments to disperse the pigments in the liquid. Dispersion in a carrier liquid enables the nano-scale ink pigments to be easily mixed with resin paste to form a pigment-resin composition. In some implementations, the nano-scale ink pigments may already be provided as a mixture of ink pigments, dispersants, carrier liquid, and other substances. In these instances, additional dispersion with carrier liquid may or may not be required for further diluting the nano-scale ink pigment mixture. In some examples, a polyamine-based dispersant may be included along with the carrier liquid in order to promote mixing. For example, the polyamine-based dispersant may be left over from step 110.

Once the nano-scale ink pigments are dispersed in a carrier liquid, a resin paste may be mixed in with the nano-scale ink pigments dispersed in the carrier fluid to form a mixture. In one example, a transparent resin paste is mixed with the nano-scale ink pigments and carrier liquid in a dual asymmetric centrifuge at about 3,500 revolutions per minute. The mixing process may thoroughly blend the nano-scale ink pigments and the resin particles that make up the resin paste.

The resin may be a polymer resin, such as a polyethylene-based plastic or some other type of plastic. Examples of polymer resin include, but are not limited to, ethylene acid copolymers; ethylene vinyl acetate copolymers; ethylene acrylic acid copolymers; methacrylic acid copolymers; ethylene vinyl acetate copolymers; copolymers of ethylene acid, acrylic acid, or methacrylic acid and alkyls; esters of methacrylic acid or acrylic acid; polyethylene; polystyrene; isotactic polypropylene; ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid)I ethylene-acrylate terpolymers; ethylene-acrylic esters-maleic anhydride (MAH) or glycidyl methacrylate (GMA) terpolymers; low molecular weight ethylene-acrylic acid ionomers, or combinations thereof. Examples of such resins are commercially available from DuPont Company (e.g., the NUCREL® series, such as NUCREL® 403, NUCREL® 407, NUCREL® 609H, NUCREL® 908HS, NUCREL® 1202HC, NUCREL® 30707, NUCREL® 1214, NUCREL® 903, NUCREL® 3990, NUCREL® 910, NUCREL® 925, NUCREL® 609, NUCREL® 599, NUCREL® 960, NUCREL® RX 76, NUCREL® 2806, and NUCREL® 2002; and the BYNEL® series, such as BYNEL® 2002, BYNEL® 2014, and BYNEL® 2020); Honeywell International, Inc. (e.g. the ACLYN® series, such as ACLYN® 201, ACLYN® 246, ACLYN® 285, and ACLYN® 295); and Arkema, Inc. (e.g. the LOTADER® series, such as LOTADER® 2210, LOTA- DER® 3430, and LOTADER® 8200). In one example, the resin may include a polyethylene resin from DUPONT.

After the resin paste is mixed with the nano-scale ink pigments and the carrier fluid, the entire mixture may be milled in presence of milling media. Milling the mixture may stimulate the attachment of the nano-scale ink pigments by the resin particles. Milling settings may be closely controlled to attach the nano-scale ink pigments to the surface of the resin particles while avoiding excess shear forces that may lead to compounding of the pigments deep toward the center of the resin particles, which may lead to loss of the desired optical improvements in the final ink layer. In one example, the mixture is mixed in a bead mill at about 3,500 revolutions per minute for about 10 minutes, in the presence of milling media comprising milling beads having an average size of about 5 millimeters.

Figure 2:
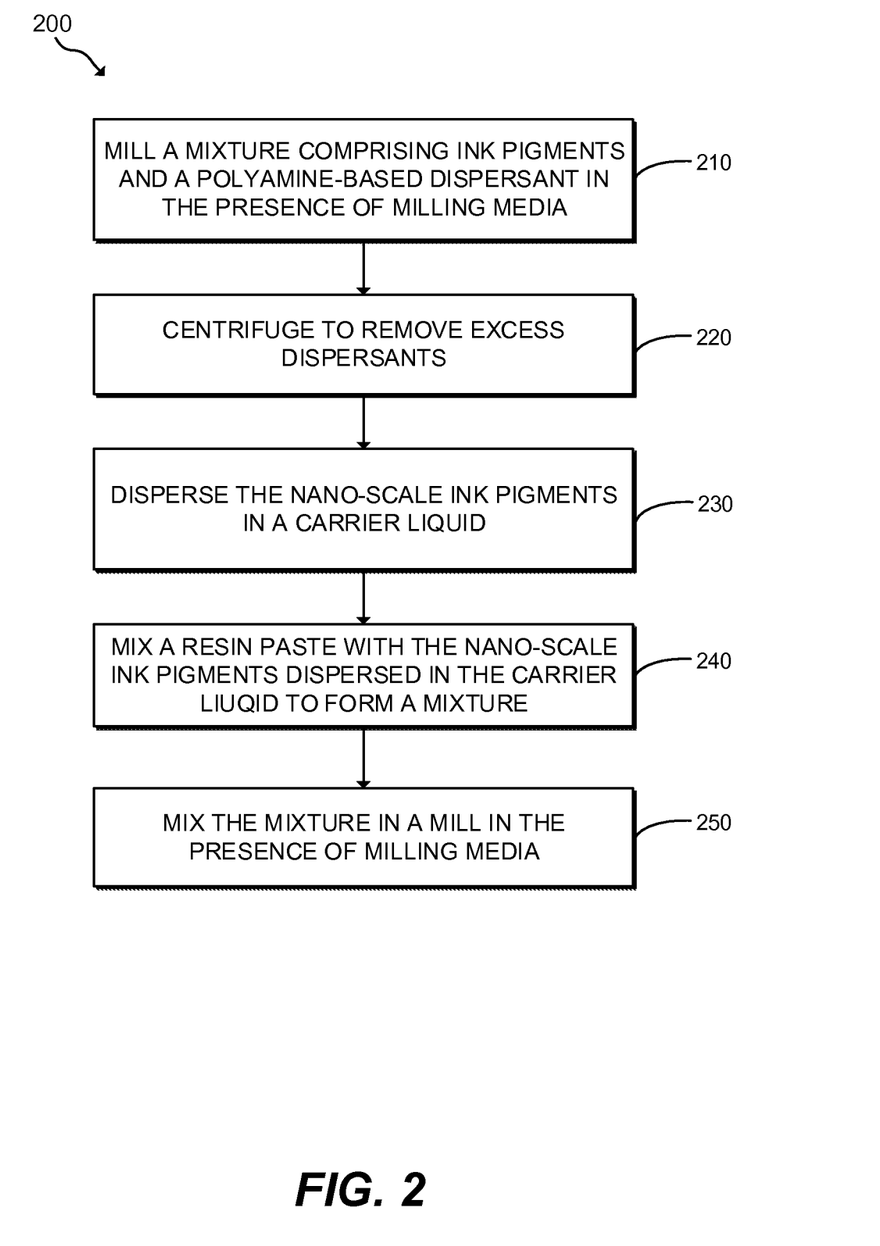
FIG. 2 is a flowchart of an example method for manufacturing a liquid electrophotographic ink concentrate including centrifuging to remove excess dispersants.

FIG. 2 depicts a flowchart of another example method 200 for manufacturing a liquid electrophotographic ink concentrate that incorporates a number of examples described above and which includes centrifuging to remove excess dispersants. Method 200 may begin in step 210, where a mixture comprising ink pigments and a polyamine-based dispersant is milled in the presence of milling media to produce nano-scale ink pigments with an average particle size of less than 100 nanometers. Detailed examples of step 210 are describe above in relation to step 110 of FIG. 1.

After milling the mixture, method 200 may proceed to step 220, where the mixture may be centrifuged to remove excess dispersants. Excess dispersants leftover from the manufacturing process may affect the development of an LEP ink during the LEP printing process by altering the electrical properties of the LEP ink. In some implementations, a pigment-dispersant mixture with greater than 20% dispersants with respect to ink pigments may be centrifuged. Other centrifugation processes that separate the dispersants from the nano-scale ink pigments may be used.

Method 200 may then proceed to step 230, where the nano-scale ink pigments are dispersed in a carrier liquid. As described above in relation to step 120 of method 100, dispersing in a carrier liquid may enable the nano-scale ink pigments to be easily mixed in subsequent steps. After dispersing the pigments in a carrier liquid, method 200 may proceed to step 240, where a resin paste is mixed with the nano-scale ink pigments dispersed in the carrier fluid to form a mixture. The mixing may blend the nano-scale ink pigments and the resin particles making up the resin paste. Lastly, method 200 may proceed to step 250, where the mixture is mixed in a mill in the presence of milling media. As described above in relation to step 120 of method 100, mixing the mixture with milling media may stimulate the attachment on and/or in the nano-scale ink pigments by the resin particles, thereby creating a pigment-resin composition. In some implementations, step 240 and step 250 may be combined into a single step. To attain the desired optical improvements disclosed herein, step 250 may be controlled to allow attachment of the nano-scale ink pigments near the surfaces of the resin particles and prevent compounding the pigments towards the interior centers of the resin particles.

Figure 3:
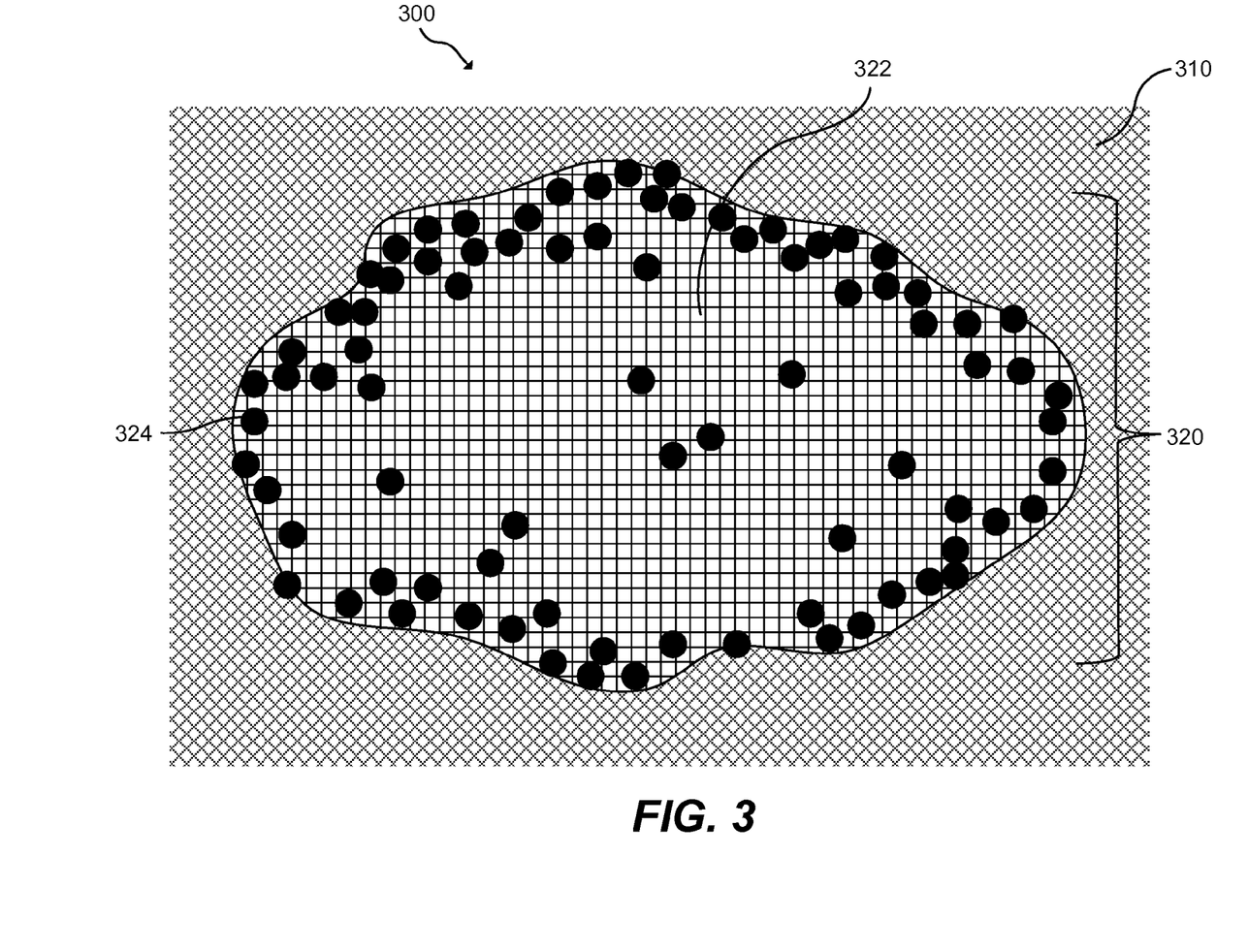
FIG. 3 is a cross-sectional view of an example liquid electrophotographic ink concentrate with nano-scale ink pigments having an average particle size of less than 100 nanometers attached near the surfaces of a base resin particle.

FIG. 3 is a cross-sectional view of an example liquid electrophotographic ink concentrate 300 with nano-scale ink pigments having an average particle size of less than 100 nanometers attached near the surfaces of a resin particle. LEP ink concentrate 300 may include a carrier liquid 310 and a pigment-resin particle 320 dispersed in carrier liquid 310. Pigment-resin particle 320 may include at least one polymer resin particle 322 attaching at least one nano-scale ink pigment 324 having an average particle size less of less than 100 nanometers, where nano-scale ink pigments 324 are attached near the surfaces of resin particles 322.

Attached near the surfaces may mean that the nano-scale ink pigments 324 are at least partially surrounded by resin particle 322 and nano-scale ink pigments 324 are concentrated at the exterior surfaces of resin particle 322. For example, as illustrated in FIG. 3, the highest concentration of attached nano-scale ink pigments 324 are located at or just under the surface of resin particle 322. The concentration of nano-scale ink pigments 324 decreases further into the interior of resin particle 322, with the lowest concentrations near the center of resin particle 322.

Carrier liquid 310 may include a polyamine-based dispersant. As described above in relation to method 100, polyamine-based dispersants may be used in some manufacturing processes for LEP ink concentrate 300. However, an excess amount of polyamine-based dispersants may alter the electrical conductivity of the LEP ink, which may affect the printing process. Therefore, in some implementations, carrier liquid 310 may contain a low enough amount of polyamine-based dispersants to avoid effecting the electrical conductivity of LEP inks formed from LEP ink concentrate 300.

In some examples, carrier liquid 310 may include an isoparaffinic hydrocarbon such as the commercially available Isopar™ isoparaffinic fluids from ExxonMobil (e.g., Isopar™ L series). The amount of carrier liquid 310 with respect to the amount of pigment-resin particle 320 may vary. In some examples, LEP ink concentrate 300 may contain a small amount of carrier liquid 310 in order to lower the volume of LEP ink concentrate 300 to attain a small product size for easy transport. In some implementations, LEP ink concentrate 300 may contain less than about 5% carrier liquid 310. In others, LEP ink concentrate 300 may contain up to about 70% carrier liquid 310.

Pigment-resin particle 320 may have an average diameter of about one micrometer to about eight micrometers. For irregularly-shaped pigment-resin particles such as particle 320, the diameter may be either the shortest distance through the particle or the longest distance through the particle. Average diameter may refer to the mean diameter of all pigment-resin particles 300 in LEP ink concentrate 300.

LEP ink concentrate 300 may include a variety of resins and inks. A more detailed list of examples are provided above in relation to FIG. 1. LEP concentrate 300 may generally be a concentrated fluid or paste, containing pigment-resin particles 320 dispersed in a relatively small amount of carrier liquid 310. In some implementations, LEP concentrate 300 may be first diluted with another fluid to form an LEP ink that is ready for use in electrophotographic printing.

Figure 4:
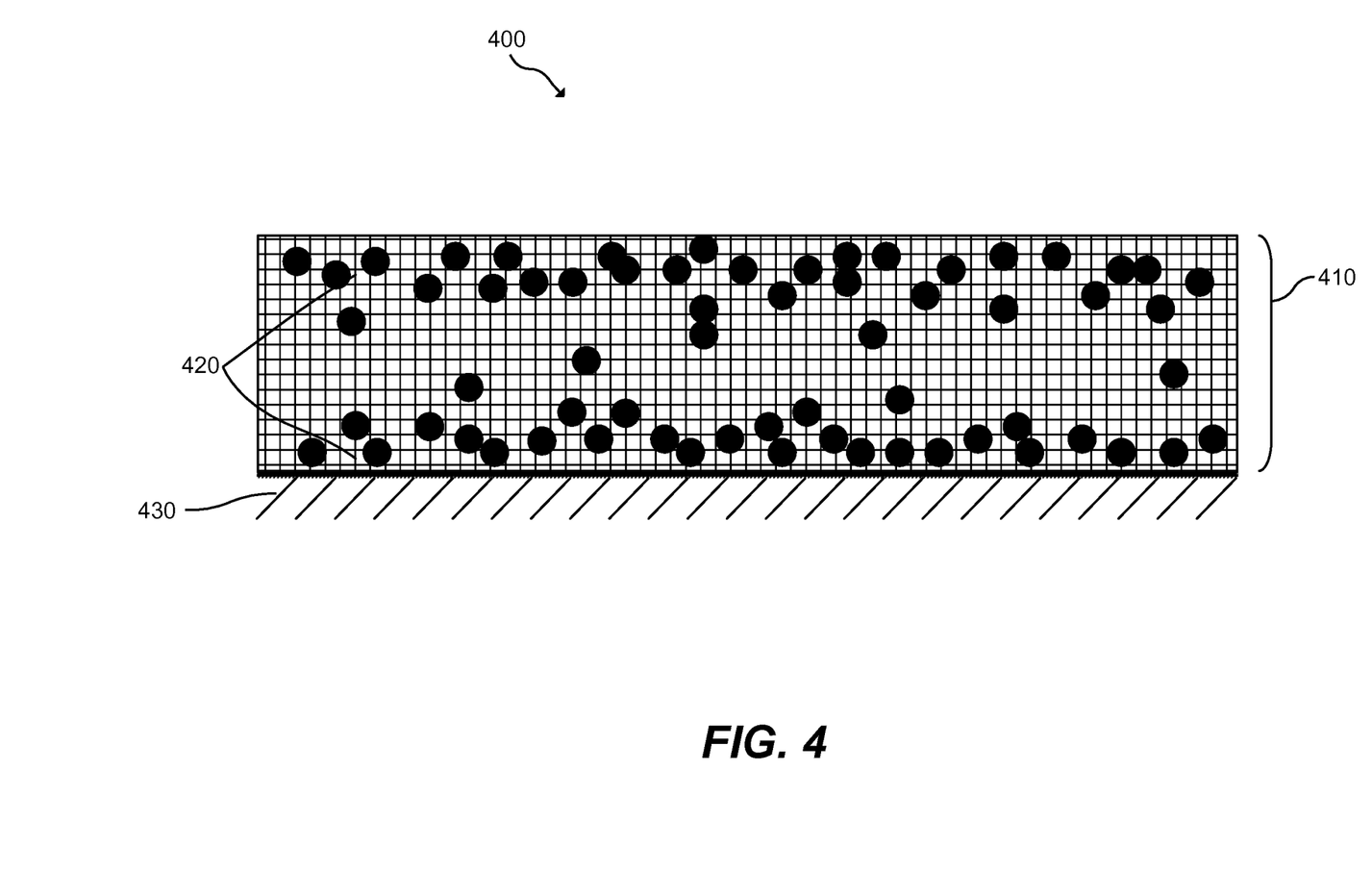
FIG. 4 is a cross-sectional view of an example liquid electrophotographic ink forming a final ink layer.

FIG. 4 is a cross-sectional view of an example liquid electrophotographic ink 400 forming a final ink layer 410 on substrate 430. LEP ink 400 may be created by diluting an LEP ink concentrate, such as LEP ink concentrate 300, with carrier liquid and/or other additives. Final ink layer 410 may be formed onto substrate 430 by an electrophotographic printing process. Final ink layer 410 may have an average thickness of one micrometer or less and have nano-scale ink pigments 420 concentrated near the surfaces of final ink layer 410.

Nano-scale ink pigments 420 may be concentrated near the surfaces of final ink layer 410 due to the placement of nano-scale ink pigments near the exterior surfaces of each pigment-resin particle in the LEP ink concentrate, such as pigment-resin particle 320 of LEP ink concentrate 300. When LEP ink concentrate 300 is formed into LEP ink 400 and printed into final ink layer 410, nano-scale ink pigments 420 may be retained near the upper and lower surfaces of the final ink layer. Such orientation may allow final ink layer 410 of LEP ink 400 to exhibit a higher optical density than an ink layer formed from an ink without nano-scale ink pigments.

Figure 5:
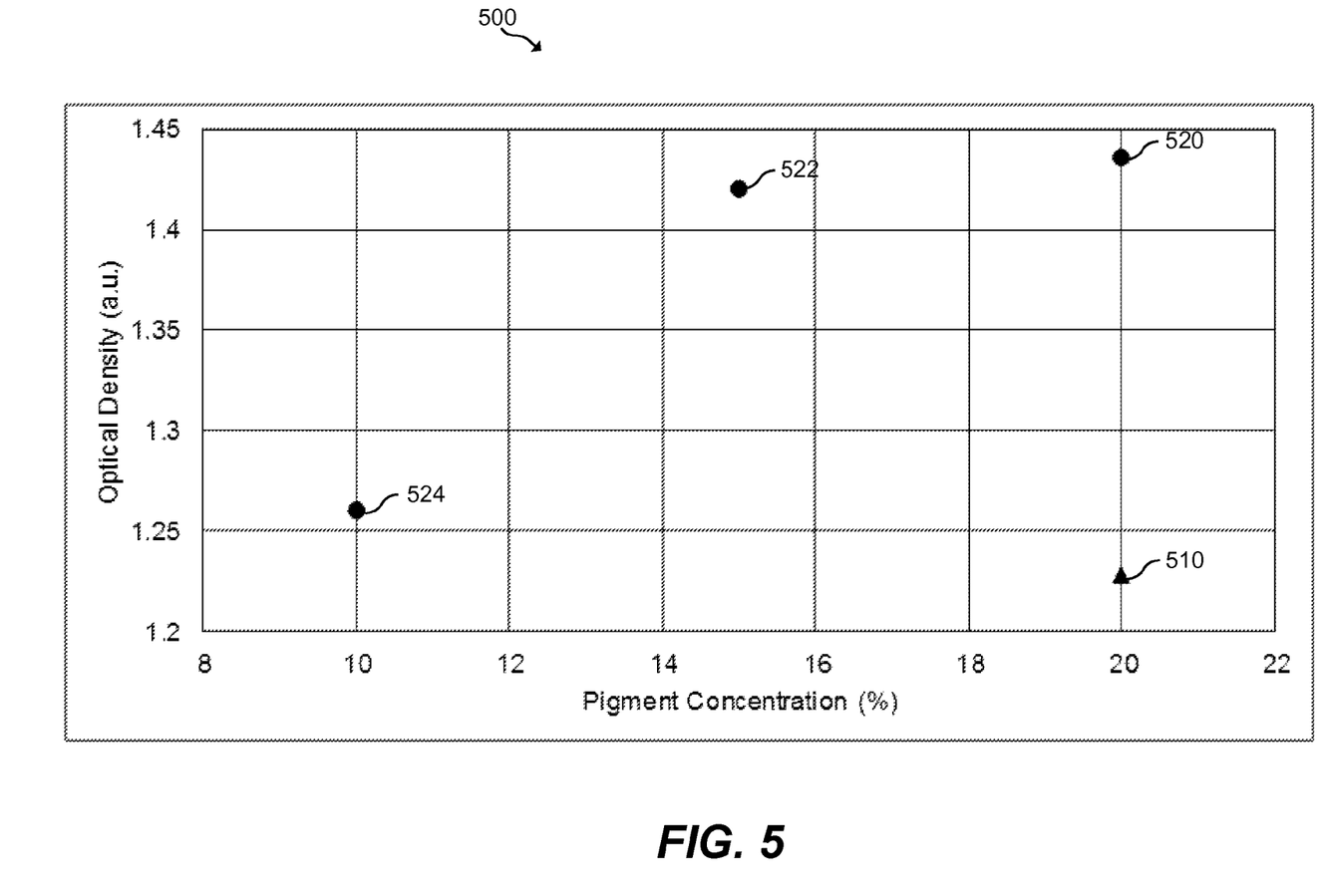
FIG. 5, on coordinates of optical density (in a.u.) and pigment concentration (in %), is an example plot of the optical density of various liquid electrophotographic inks.

FIG. 5, on coordinates of optical density (in a.u.) and pigment concentration (in %), is an example plot 500 of the optical density of various liquid electrophotographic inks. The vertical axis of plot 500 shows optical density in units of a.u., while the horizontal axis of plot 500 shows pigment concentration in percentage. Data points 510, 520, 522, and 524 show the optical densities of four different ink samples in relation to the pigment concentration of each sample.

Data point 510 represents a magenta ink with 20% pigment concentration. The ink of data point 510 was not produced by example methods disclosed herein and do not contain nano-scale ink pigments described herein. As shown in plot 500, the ink represent by data point 510 shows an optical density of about 1.23.

Data point 520 represents a magenta ink, such as LEP ink 400, with 20% concentration of magenta nano-scale ink pigments. As shown in plot 500, the ink represented by data point 520 shows an optical density of about 1.44. Data point 522 represents a magenta ink, such as LEP ink 400, with 15% concentration of magenta nano-scale ink pigments. As shown in plot 500, this ink shows an optical density of about 1.42. Data point 524 represents a magenta ink, such as LEP ink 400, with 10% concentration of magenta nano-scale ink pigments. This ink shows an optical density of about 1.26.

As shown in plot 500, the ink of data point 520 shows a higher optical density than the ink of data point 510 by about 17%, while having the same pigment concentration. The ink of data point 524, by comparison, has about half the pigment concentration as the ink of data point 520, but the two inks display comparable optical densities. As shown in plot 500, the methods and inks disclosed herein may enhance optical density of LEP inks and/or reduce cost per page of printing by allowing the use of ink that contain less ink pigments than their counterparts that do not contain nano-scale ink pigments.

EXAMPLES

Example 1

Magenta Nano-Scale Pigments

In this example, a starting mixture was provided with the following concentrations: 24% magenta pigment, 12% polyamine-based dispersants (OS#13309), 18% heavy oil, and balance Isopar™ L. 500 grams of the starting mixture was sonicated in a probe sonicator for 10 minutes at 90% power. The average particle size of the pigments was measured with a Malvern Zetasizer Nano ZS, dynamic light scattering particle size analyzer. The particle size was 580 nm. A 120 g of the mixture was added to 1000 g of 0.05 mm(50 μm) 3M Micro Milling Media ZGC-50 in a 750 cc stainless steel tank. A stainless steel agitator disk was use to mix the sample in a Union Process 01 Series Attritor. The solution was then milled in the S0 for 10 minute intervals, and the particle size measured. The milling speed was 2300 rpm at 30 Hertz. When the solution became drier during the milling and the particle size increased, Isopar L was added to continue the milling. The particle size reached 143.6 nm with 50% dispersant concentration. Additional dispersant (11.4 g) was added and milled. Particle size was reduced to 99.49 nm. With additional dispersant (10 g), particle size was reduced to 82.15 nm. Another addition of dispersant (10 g) resulted in a reduced particle size of 75.55 nm. The particle size did not reduce further after this step and the milling was stopped. Table 1 shows the resulting particle size after each step of milling. The concentration of the final mixture was 14% magenta pigment, 10.5% polyamine base dispersant (OS#13309), 14% heavy oil, and balance Isopar™ L. Overall milling time was 800 minutes.

A mixture of 20% disperse nano-scale pigment formed above and 80% transparent electro-ink was mixed using a Speedmixer-Dual Asymmetric Centrifuge for 10 minutes at 3500 rpm. The mixture was then milled with a Fritsch Planetary Mill with 5 mm ceramic beads for 10 minutes at 3500 rpm.

Excess polyamide dispersant was removed from the mixture with an Ultra Centrifuge from Beckman Instruments. The mixture was centrifuged for 30 minutes at 80,000 rpm. The pigments with attached dispersants settled to the bottom of the vial, and the excess dispersants remained in the liquid on top. The liquid was removed, and new Isopar™ L was added to the vial and mixed and sonicated in a water bath. The mixture was centrifuge 5 times, and the dispersant concentration was reduced from 75% to 59%.

TABLE 1

| Pigment % | Disp % | Disp % WRT | Particle Size |
|---|---|---|---|
| 24.0 | 12.0 | 50.0% | 580 |
| 21.2 | 10.6 | 50.0% | 181.5 |
| 19.2 | 9.6 | 50.0% | 173.9 |
| 18.0 | 9.0 | 50.0% | 143.6 |
| 16.8 | 9.7 | 57.9% | 99.49 |
| 15.9 | 10.3 | 64.9% | 82.15 |
| 15.1 | 10.8 | 71.8% | 75.55 |
| 14.3 | 10.3 | 71.8% | 75.55 |
| 14.0 | 10.5 | 75.3% | 75.48 |

Example 2

Yellow Nano-scale Pigments

In this example, a starting mixture was provided with the following concentrations: 30% yellow pigment, 6% polyamine-based dispersants (OS#13309), 9% heavy oil, and 55% Isopar™ L. The dispersant concentration with respect to the pigment concentration was 20%. 500 g of the mixture was sonicated in a probe sonicator for 10 minutes at 90% power. The average particle size of the pigments was measured with a Malvern Zetasizer Nano ZS, dynamic light scattering particle size analyzer. The particle size was 155 nm. 130 grams of the mixture was milled with 1000 g of 0.05 mm (50 μm) 3M Micro Milling Media ZGC-50 in a Union Process 01 Series Attritor. Additional Isopar L and dispersant were added to lower the viscosity during the milling process. The final particle size was 60 nm. The final mixture concentration was 18.35% yellow pigment, 7.44% polyamine-based dispersants, 11.16% heavy oil, 63.04% Isopar™ L The final dispersant concentration with respect to the pigment concentration was 40.5%. Milling was performed at 20 Hz or 1500 rpm, with a total milling time of 180 minutes. It was observed that the liquid became darker during milling. A significant change in color was observed when the pigments were reduced from a size of 85 nm to 75 nm. The mixture at 75 nm was significantly darker and more translucent than the mixture with larger-sized pigments.

What is claimed is:

1. A method of manufacturing a liquid electrophotographic ink concentrate comprising:
   milling a mixture comprising ink pigments and polyamine-based dispersants in the presence of milling media to produce nano-scale ink pigments having an average particle size of less than 100 nanometers; and
   attaching at least one nano-scale ink pigment near surfaces of a base resin particle to form a pigment-resin composition,
   wherein the mixture comprises polyamine-based dispersants in an amount ranging from about 20% to about 75% with respect to pigment concentration,
   wherein the mixture is milled using high shear with an attritor in the presence of milling media, and
   wherein the milling media comprises a ceramic grinding media having an average size of about 0.05 millimeters.

2. The method of claim 1, wherein attaching the nano-scale ink pigments near surfaces of a base resin particle to form a pigment-resin composition comprises:
   dispersing the nano-scale ink pigments in a carrier liquid;
   mixing a resin paste with the nano-scale ink pigments dispersed in the carrier liquid to form a mixture; and
   mixing the mixture in a mill in the presence of milling media.

3. The method of claim 2, wherein the carrier liquid comprises an isoparaffinic hydrocarbon.

4. The method of claim 2, further comprising mixing transparent resin paste with the nano-scale ink pigments dispersed in the carrier liquid in a dual asymmetric centrifuge at about 3,500 revolutions per minute.

5. The method of claim 2, further comprising mixing the mixture in a bead mill at about 3,500 revolutions per minute for about 10 minutes, in the presence of milling media comprising milling beads having an average size of about 5 millimeters.

6. The method of claim 1, wherein the base resin particles comprise a transparent polymer.

7. The method of claim 1, further comprising centrifuging the liquid electrophotographic ink concentrate to remove excess dispersants.

8. A method of manufacturing a liquid electrophotographic ink concentrate comprising:
   milling a mixture comprising ink pigments and polyamine-based dispersants in the presence of milling media to produce nano-scale ink pigments having an average particle size of less than 100 nanometers; and
   attaching at least one nano-scale ink pigment near surfaces of a base resin particle to form a pigment-resin composition by:
   dispersing the nano-scale ink pigments in a carrier liquid;
   mixing a transparent resin paste with the nano-scale ink pigments dispersed in the carrier liquid in a dual asymmetric centrifuge at about 3,500 revolutions per minute to form a mixture; and
   mixing the mixture in a mill in the presence of milling media.

9. The method of claim 8, wherein the mixture comprises polyamine-based dispersants in an amount ranging from about 20% to about 75% with respect to pigment concentration.

10. The method of claim 9, wherein the mixture is milled using high shear with an attritor in the presence of milling media.

11. The method of claim 10, wherein the milling media comprises a ceramic grinding media having an average size of about 0.05 millimeters.

12. The method of claim 8, wherein the carrier liquid comprises an isoparaffinic hydrocarbon.

13. The method of claim 8, further comprising mixing the mixture in a bead mill at about 3,500 revolutions per minute for about 10 minutes, in the presence of milling media comprising milling beads having an average size of about 5 millimeters.

14. The method of claim 8, wherein the base resin particles comprise a transparent polymer.

15. The method of claim 8, further comprising centrifuging the liquid electrophotographic ink concentrate to remove excess dispersants.

16. A method of manufacturing a liquid electrophotographic ink concentrate comprising:
   milling a mixture comprising ink pigments and polyamine-based dispersants in the presence of milling media to produce nano-scale ink pigments having an average particle size of less than 100 nanometers; and
   attaching at least one nano-scale ink pigment near surfaces of a base resin particle to form a pigment-resin composition by:
   dispersing the nano-scale ink pigments in a carrier liquid;
   mixing a resin paste with the nano-scale ink pigments dispersed in the carrier liquid to form a mixture; and
   mixing the mixture in a bead mill at about 3,500 revolutions per minute for about 10 minutes, in the presence of milling media comprising milling beads having an average size of about 5 millimeters.

17. The method of claim 16, wherein the mixture comprises polyamine-based dispersants in an amount ranging from about 20% to about 75% with respect to pigment concentration.

18. The method of claim 17, wherein the mixture is milled using high shear with an attritor in the presence of milling media.

19. The method of claim 18, wherein the milling media comprises a ceramic grinding media having an average size of about 0.05 millimeters.

20. The method of claim 16, wherein the carrier liquid comprises an isoparaffinic hydrocarbon.

* * * * *